March 31, 1970    M. CLAMP ET AL    3,503,827
APPARATUS FOR TREATING PLASTIC WITH HEAT AND PRESSURE
Filed Oct. 19, 1966    6 Sheets-Sheet 4

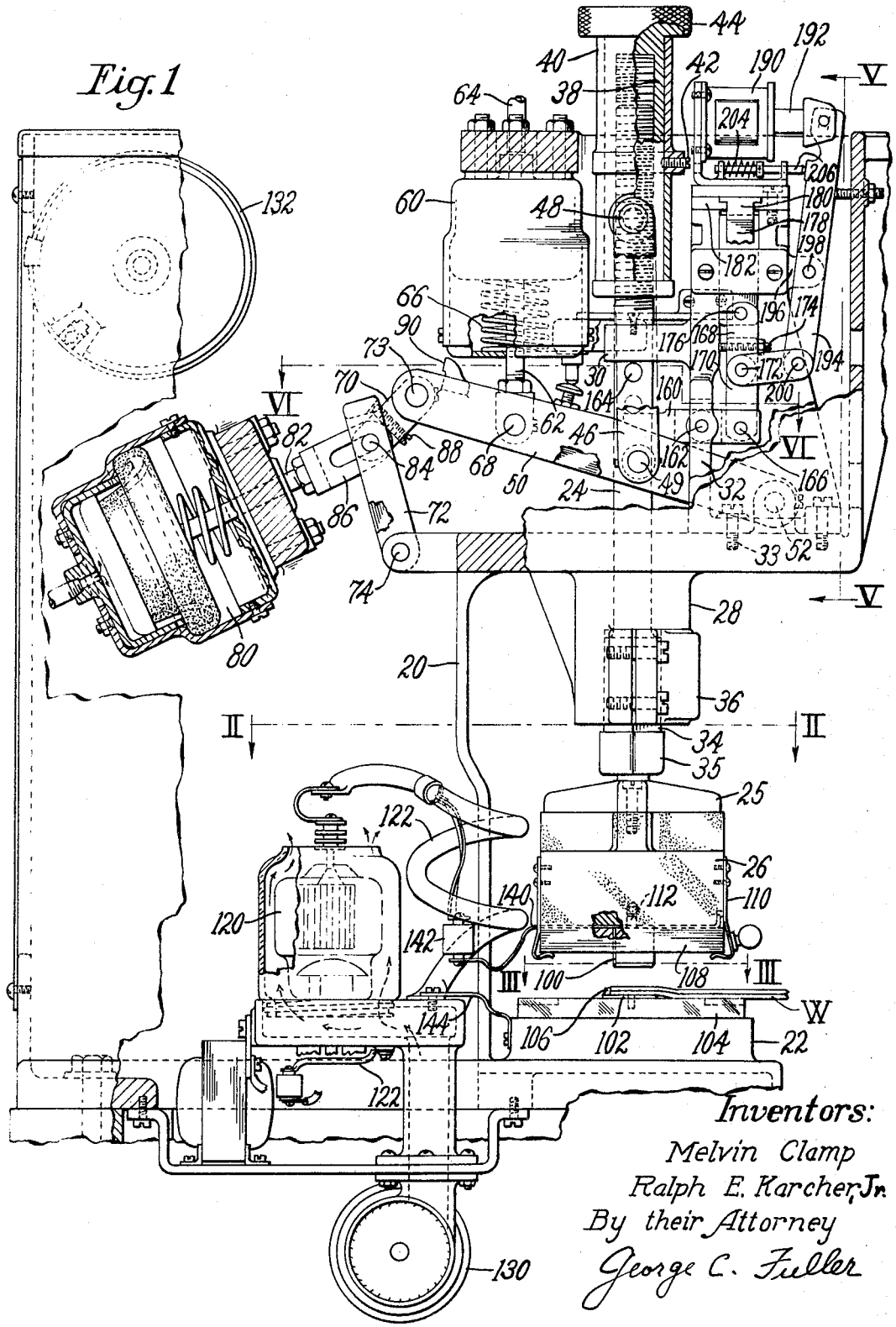

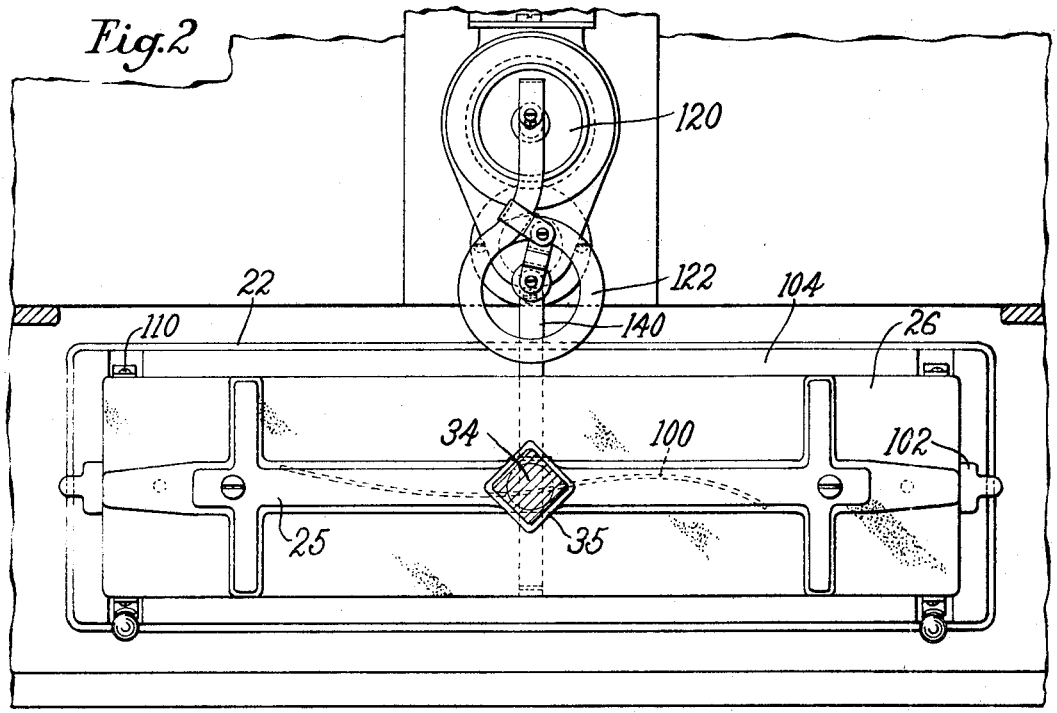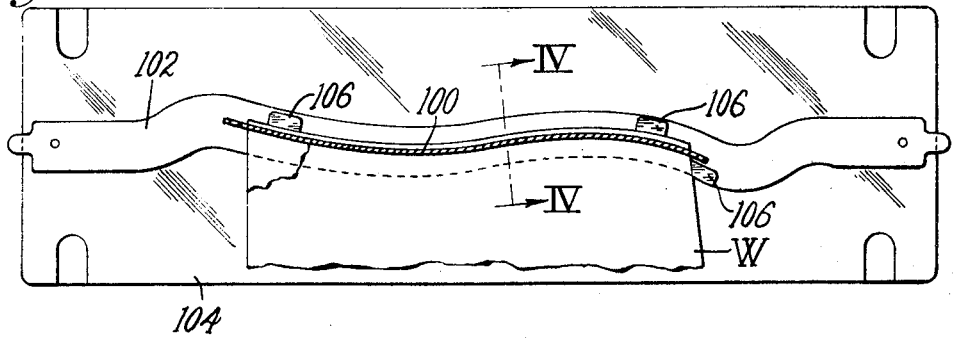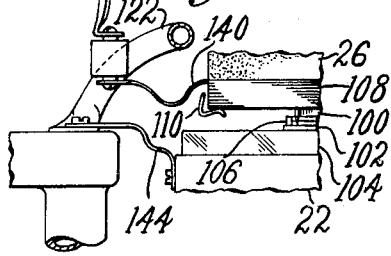

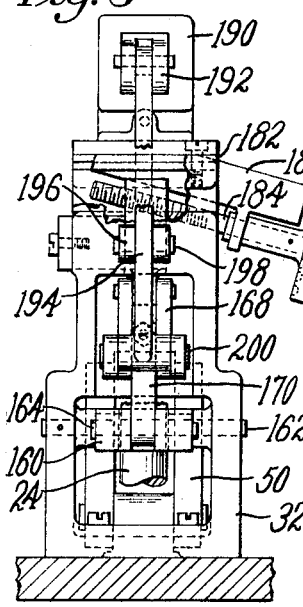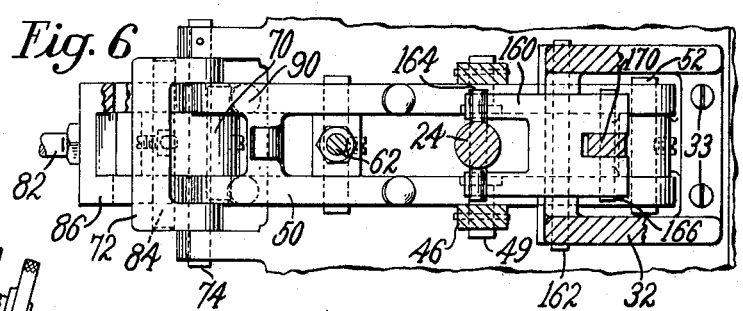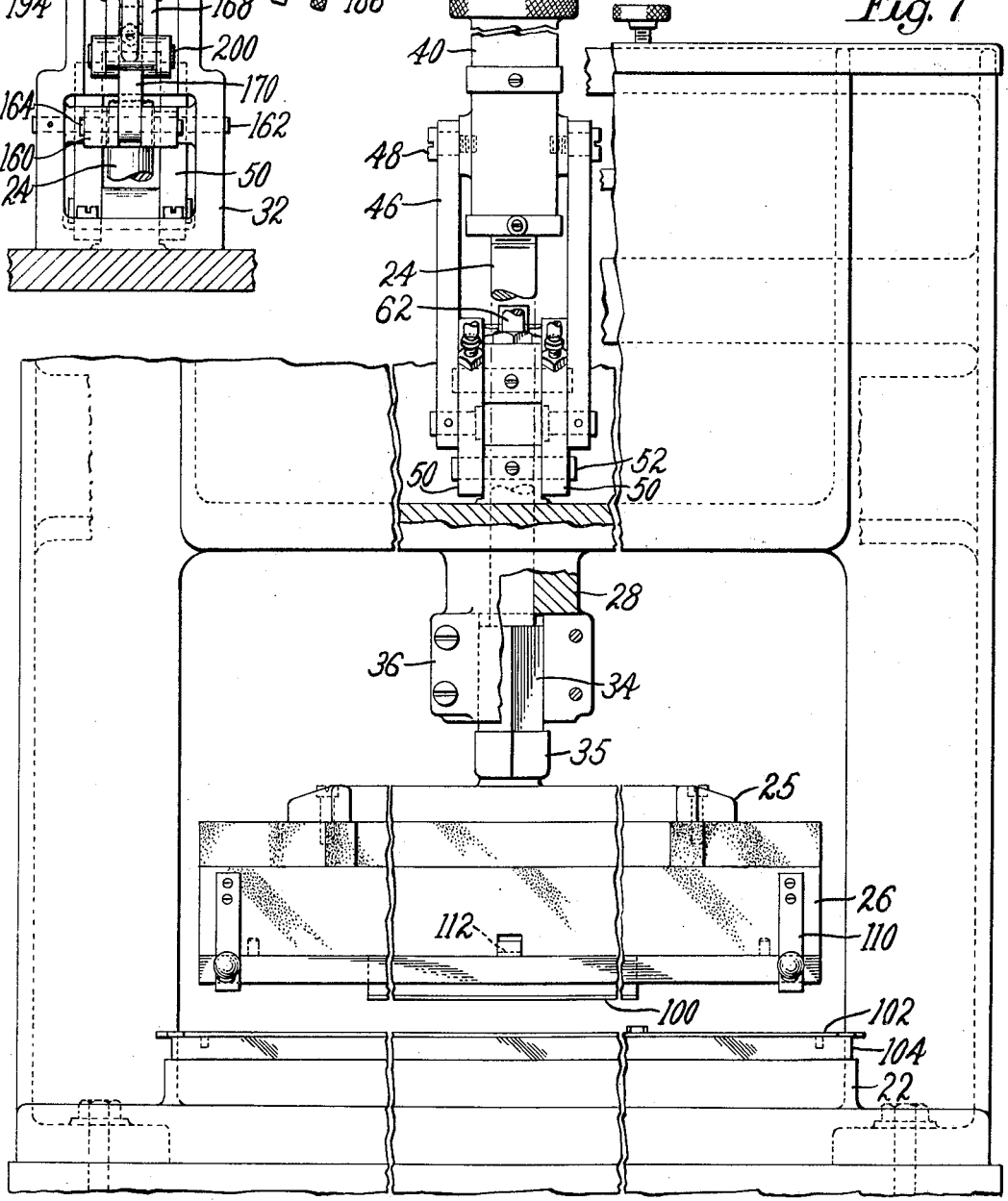

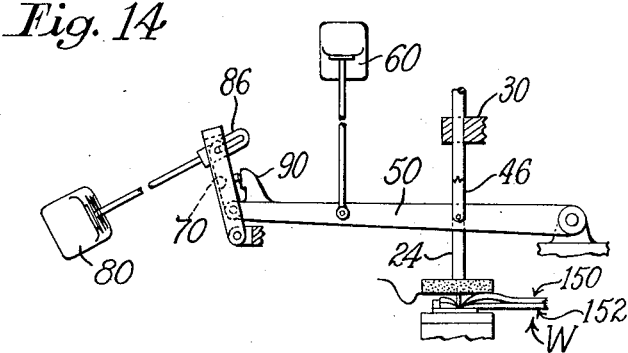
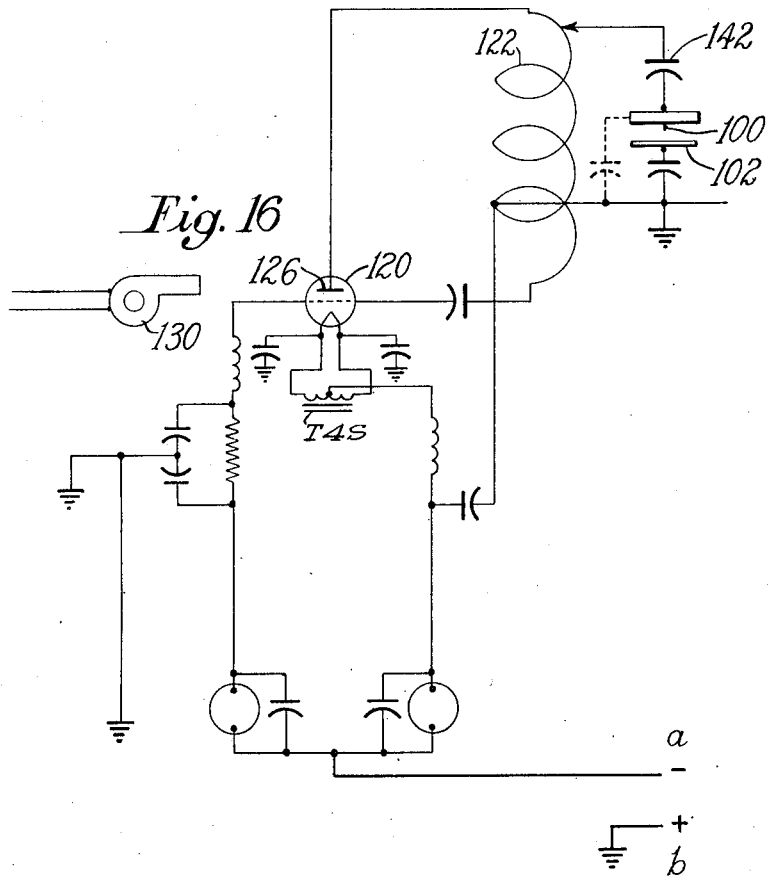

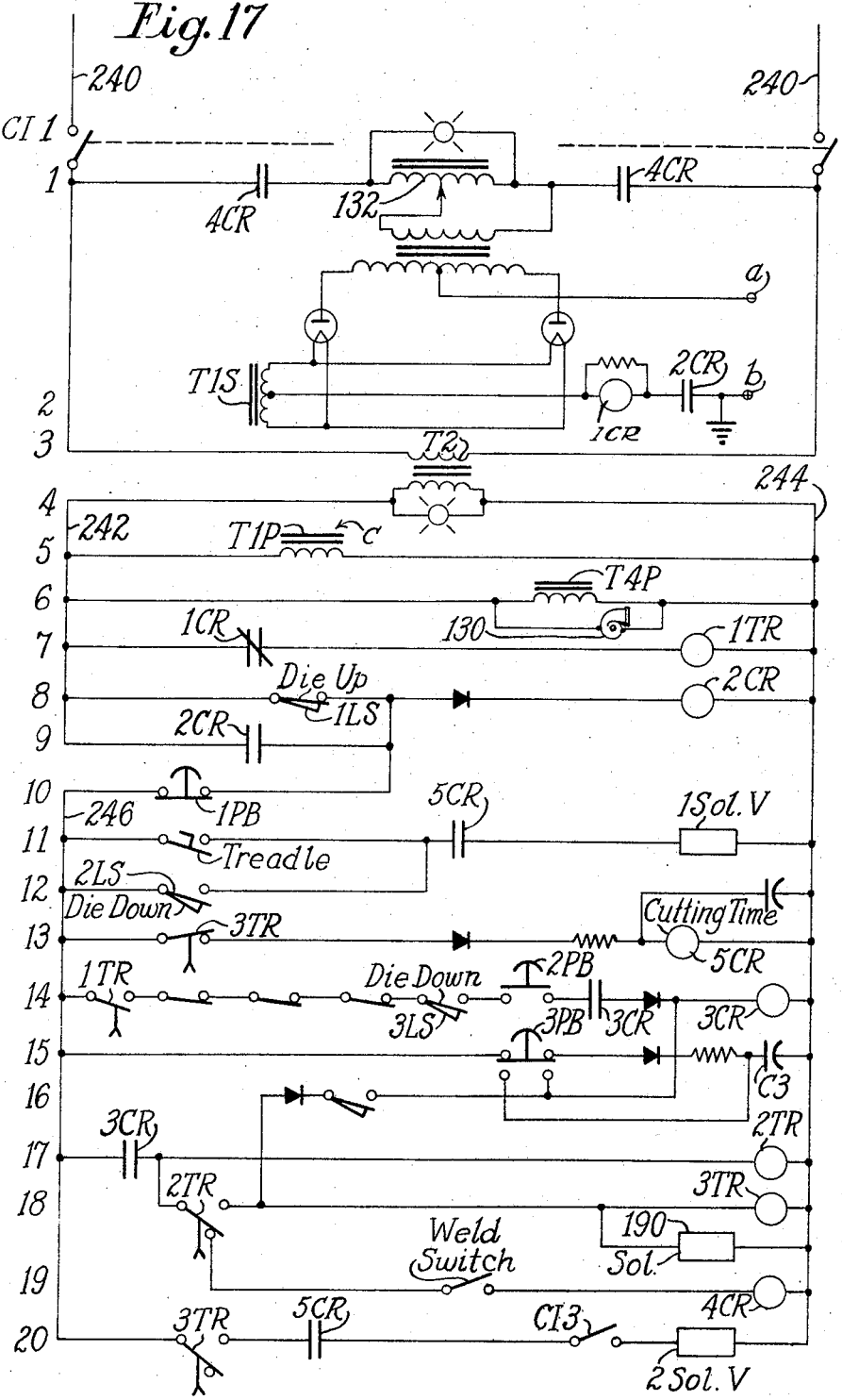

United States Patent Office 3,503,827
Patented Mar. 31, 1970

3,503,827
APPARATUS FOR TREATING PLASTIC WITH
HEAT AND PRESSURE
Melvin Clamp, North Andover, and Ralph E. Karcher, Jr., Magnolia, Mass., assignors to USM Corporation, Flemington, N.J., a corporation of New Jersey
Filed Oct. 19, 1966, Ser. No. 587,795
Int. Cl. B29c 19/02
U.S. Cl. 156—380    7 Claims

ABSTRACT OF THE DISCLOSURE

A dielectric welding cutting press having relatively movable presser members and electrodes for dielectrically heating a workpiece. An adjustable stop is provided to prevent the electrodes from creeping too close to one another when the work is under pressure, and a pair of air motors cause relative movement of the presser members, the one motor providing the final heavy pressure having a greater mechanical advantage than the other.

---

This invention relates to improvements in apparatus for treating dielectric heat softenable workpieces by dielectrically heat softening areas thereof and pressing a tool against the workpieces in such areas, for example, for bonding, embossing, or cut seaming the workpieces.

Typical apparatus for carrying out such treatment comprises first and second presser members mounted for relative movement toward and away from each other, at least one of said members carrying a tool arranged to engage an interposed workpiece, power means for effecting such movement, heating means comprising an electrode carried by each support, and means for connecting the heating means to a source of high frequency electric current. Commonly, though not necessarily, the tool constitutes one electrode of the heating means.

In an exemplary operation for both cutting and seaming, one electrode may comprise a die formed with an edge for bonding and then cutting layers of a workpiece along boundaries defined by said edge. The presser members are initially operated to grip an interposed workpiece lightly but firmly so that the work is securely held by the tool in desired configuration while the electrodes of the heating means are suitably spaced for establishing an electric field in an area subsequently to be operated upon by the tool. In the exemplary treatment, after a period of dielectric heating, the presser members are operated to apply heavy pressure so that the die edge coalesces the bonding interfaces and cuts the workpiece. In another form the electrode may comprise an embossing plate formed with an intaglio or cameo design for embossing a layer of material. Similarly, such a plate or a smooth plate may be employed as an electrode in bonding one layer of a workpiece to another layer.

In such apparatus one of the problems has been arcing between electrodes while the workpiece is under holddown pressure. Commonly, nicely maintaining a suitable light but firm pressure is difficult, especially if work conditions vary even slightly. If the pressure is too great, holding the workpiece under such pressure during the heating stage presents the hazard that the softening of the workpiece under heat may permit the electrodes to move into such proximity as to invite arcing with well-known deleterious results.

It is an object of the present invention to provide apparatus of the foregoing type wherein the danger of arcing brought about by such undesirable movement of an electrode during heating is minimized without impeding the application of adequate pressure by further relative movement of the presser members during a subsequent portion of the treatment.

To this end and in accordance with a feature of the present invention, there is provided, in apparatus of the foregoing type, positive stop means movable between an operative position in which the relative movement of the presser members toward each other is limited for establishing a minimum spacing of the electrodes during the heating stage of the treatment and an inoperative position in which such movement is not so limited, and means including control means operable to effect movement of said stop means to inoperative position to permit further relative movement of the members for completion of a treatment of a workpiece after a period of dielectric heating. The provision of such a stop means permits the application of a generous holddown pressure without fear of causing arcing, and permits, when desired, further movement of the members after release of the stop means.

In accordance with another feature of the invention, said control means comprises timing means for causing said movement of the stop means into inoperative position to be effected in predetermined time relation with the termination of dielectric heating.

In accordance with a further feature of the invention the illustrative apparatus has additional power means controlled by said timing means for operation in predetermined time relation with the movement of the stop means into inoperative position following a predetermined dielectric heating interval for effecting relative movement of said presser members toward each other under a pressure greater than the aforesaid holddown pressure for effecting a finishing step of the treatment.

Heretofore in presses of the foregoing type, means have been provided for holding down a movable electrode under one degree of pressure while dielectric heating takes place, and for thereafter providing a much greater degree of pressure for driving the electrode to the termination of a stroke. Three examples of finishing steps which may require a heavy terminal pressure are to cut at least partly through a workpiece, deeply to emboss heat softened material or to effect coalescence and bonding of heat softened layers. In such apparatus, the holddown pressure has been provided by a fluid pressure operated motor while the terminal pressure has been provided by a separate system comprising, for example, an electric motor, a flywheel, and connecting means comprising a pitman. Sometimes a separate fluid-pressure operated motor of proportionately larger diameter has been used.

It is a further object of the present invention to provide simplified, compact and less expensive means for providing such heavy terminal pressure for urging one presser member toward the other.

To this end and in accordance with a further feature of the present invention, means for supplying such terminal pressure to one support comprises a second fluid pressure operated motor and connecting means including a toggle for connecting said motor and said presser member for effecting movement thereof by operation of the motor in moving a piston rod thereof from a retracted to an extended position. The toggle provides a mechanical advantage, as measured by the ratio of incremental movements of the motor and the presser member which is much greater than that provided by the means connecting the presser member and the motor providing the holdown pressure. The increasing mechanical advantage of a toggle as the stroke of the presser member nears its terminal position is advantageous in many finishing steps such as cutting.

Advantageously, the connecting means also includes, between the second motor and the toggle, lost motion means providing, in the retracted position of the motor, sufficient relative motion between the piston rod and the toggle to permit movement of the presser member toward dand away from the other by the first motor without having to move the piston rod of the second motor.

Other features and advantages of the invention will best be understood from the following description taken together with the accompanying drawings in which:

FIG. 1 is a side elevation partly in section of illustrative apparatus embodying the present invention;

FIG. 2 is a section taken on line II—II of FIG. 1 showing a portion of the apparatus shown in FIG. 1;

FIG. 3 is a section taken on line III—III of FIG. 1;

FIG. 4 is a partial section taken on lines IV—IV of FIG. 3;

FIG. 5 is a section taken on line V—V of FIG. 1;

FIG. 6 is a section taken on line VI—VI of FIG. 1;

FIG. 7 is a front elevation of the apparatus shown in FIG. 1 partly in section, with parts broken away and with centripetal lateral closure of side portions;

FIGS. 8–15 are diagrams of presser member operating power means in various positions of intermediate linkage thereof and, collaterally arranged therewith, concomitant enlarged sections of the electrodes and work;

FIG. 16 is a schematic of the oscillator circuit of the circuit of the illustrative apparatus; and FIG. 17 is a schematic of the electric control circuit of the illustrative apparatus.

Figure 8:
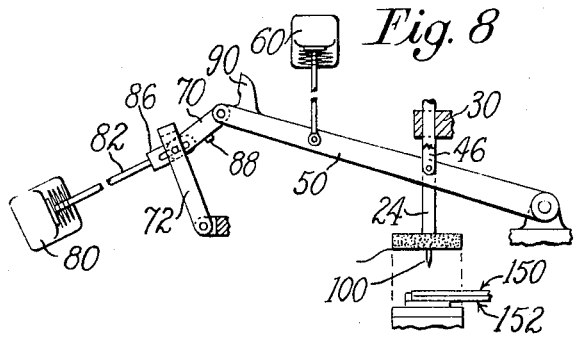
Figure 9:
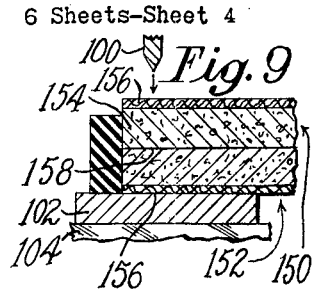

Referring to FIGS. 1–4, the illustrative apparatus comprises a frame 20 carrying a work support 22 which constitutes one of a pair of cooperative presser members. A rod 24, carrying at its lower end a cruciform foot 25 for a presser member 26 cooperative with the presser member 22, is journaled for heightwise axial movement in a depending boss 28 of the frame and in a lateral boss 30 of an auxiliary frame member 32 secured to the frame by screws 33. A portion 34 of the bottom end of the rod adjacent the boss 28 is rigid with a collar 35, the portion 34 being generally square in cross section and being received in guideway means formed by the boss 28 and a cover plate 36, thereby supporting the rod 24 against rotation.

The upper end of the rod 24 is in threaded engagement with an inner sleeve 38 normally retained in seated disposition on a re-entrant flange at the bottom of a trunnioned outer sleeve 40 by a set screw 42. When this screw is loosened, the inner sleeve may be rotated by a knurled knob 44 for raising or lowering the upper presser member to adjust its lower terminal position.

Drag links 46 (FIG. 6 and 7) depending from trunnions provided by a pair of shoulder screws 48 are connected to a pin 49 intermediate the ends of a main lever arm 50 pivoted on a pin 52 at the base of the auxiliary frame member 32.

Means for effecting closing movement of the presser members 22 and 26 comprises a diaphragm air motor 60 of conventional design having a piston rod 62 urged downwardly upon the application of air pressure to the motor 60 by means of a conduit 64. A spring 66 effects retraction of the piston rod when the air pressure is relieved. The rod 62 is pivotally connected by means comprising a pin 68 with the main lever arm 50 at a location spaced from the pin 52 to provide a substantially constant mechanical advantage of approximately two to one for the motor 60 in effecting heightwise movement of the presser member 26.

The outer end of the main lever arm 50 is connected to the frame 20 by a reverse toggle comprising an upper link 70 and a lower link 72, the former being connected to the arm 50 by a pin while the latter is connected to the frame by a pin 74. An air motor 80 similar to, but larger than, the motor 60 has its piston rod 82 connected with lost motion to a pin 84 by which the links 70 and 72 are pivotally interconnected. The outer end of the rod 82 is provided with connecting means 86 having an axially elongated slot in which the pin 84 is received. The lost motion thus afforded permits the link 72 to rock during folding of the toggle as the lever 50 moves to a position (FIG. 12) in which its outer end is disposed between the bifurcations of the link 72. In this position of the toggle, the application of a force by the motor 80 has a tremendous mechanical advantage which increasing in the terminal portion of the closing movement of the presser member 26, is of significant advantage in providing the pressure required to cut through the material after the heating and cooling operation of the cycle. The downward force provided for the presser member 26 by the motor 60 may be varied to provide suitably about 9 pounds per lineal inch of die, being thus in the order of magnitude of 100–250 pounds total while that provided by the motor 80 may exceed 12,000 pounds. A set screw 88 in the link 70 cooperates with an abutment 90 on the lever 50 to provide an "over-center" stop.

Heating means for subjecting a workpiece to a high frequency electric field comprise upper and lower electrodes which are illustrated by way of example respectively as an elongated cut-seaming knife electrode 100 (FIGS. 2–4) and an elongated flat plate electrode 102 conforming generally in outline with the contour of the knife electrode 100 and doweled into a dielectric spacer block 104. The latter electrode, which carries dielectric stops 106 to facilitate positioning of a workpiece W, is mounted in a dielectric matrix 108 through which the knife extends downwardly. The matrix 108 is retained at the bottom of the presser member 26 by clips 110 and dowels 112 (FIG. 1).

Means for supplying high frequency electric energy to the electrodes comprises an oscillator having a triode power tube 120 and a tank coil 122 connected at one end to the anode of the triode 120. The tank coil 122 comprises three turns of copper tubing (of which two and a half turns are visible in FIG. 1) and is connected at a point approximately one-half turn from its lower end to the frame 10. The lower end of the tank coil is capacitively coupled to the oscillator grid.

Referring to FIG. 16, the oscillator is operated with the tank coil 122 and the anode at D.C. ground while D.C. current is provided by connecting a center tap of the secondary T4S of a filament transformer T4 to a source of high voltage negative potential. Accordingly, there is no hazard of D.C. shock from the tank coil itself. During operation of the oscillator a power blower 130 (FIG. 1) provides a forced draft for cooling the triode 120 the power output of which is controllable by variable transformer means 132.

Means for connecting the knife electrode 100 to the oscillator comprises a flexible conductive strap 140 extending from the front edge of the support 26, and passing rearward over in engagement with the knife electrode 100 to the oscillator where it is connected through a capacitor 142 to the upper end of the tank coil. The lower electrode 102 is capacitively coupled through the spacer block 104 to the work support 22. The latter is connected by a conductive strap 144 to the ground point of the tank coil 122.

In a typical seaming operation, illustrated diagrammatically in FIGS. 8–15, the workpiece comprises two multi-layer parts 150 and 152 (FIG. 8). Each part comprises a layer of foamed plastic 154 (FIG. 9) having a fabric backing 156 on one side and a so-called skin 158 on the other side. In the illustrative cut-seaming treatment, the work parts are assembled in skin-to-skin relation and the assembled workpiece is disposed over the electrode 102 on the work support 22 with the desired seam location under the electrode 100 (see FIGS. 8 and 9). The upper electrode 100 is then brought down on the workpiece by admitting air to the motor 60, the upper electrode engaging the workpiece and then compressing the work parts (FIGS. 10 and 11) and moving into suitable proximity to the lower electrode 102 for dielectric heating of the adjacent areas of the workpiece.

Figure 10:
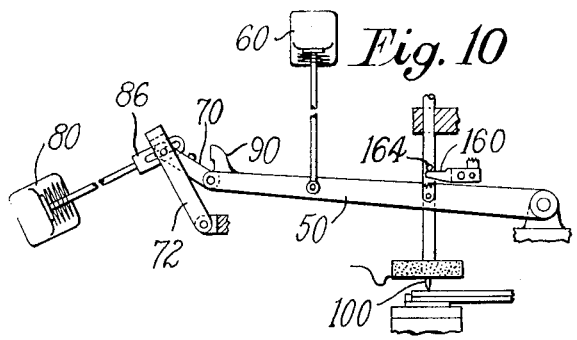
Figure 11:
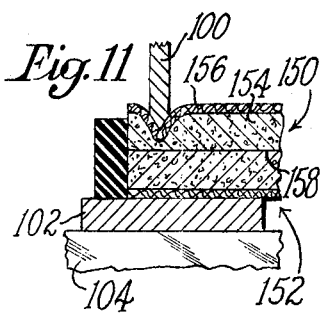
Figure 12:
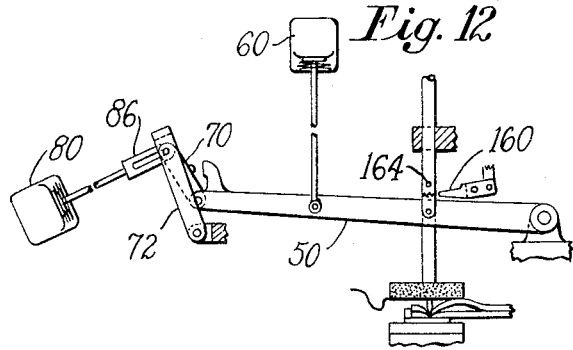
Figure 13:
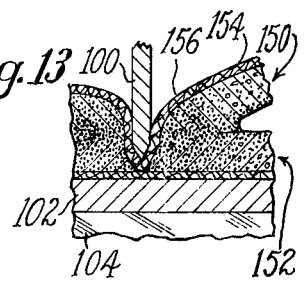

During the heating portion of the cycle, the electrodes must not be permitted to approach too closely lest a hazard of arcing be created. Depending upon the nature of the work parts, the initial pressure provided by the motor 60 might not suffice to cause the electrode 100 to move closer than desired to the lower electrode 102. In either event, during the application of dielectric heat, if the upper electrode is continuously urged toward the lower electrode, after penetrating the heat softened material to the minimum desired spacing from the lower electrode, the upper electrode will continue to penetrate the workpiece so that it is desirable to interrupt the movement of approach of the upper electrode at a predetermined spacing from the lower electrode (FIG. 10). However, after the heating portion of the cycle, to insure amalgamation of the work parts in the bonding area, it is desirable to apply pressure thereto by permitting resumption of the movement of approach of the electrode (FIG. 12).

Accordingly, releasable means for interrupting the closing movement of the upper electrode at a suitable predetermined spacing from the lower electrode is provided in accordance with the feature of the present invention. Accordingly, referring to FIGS. 1, 5 and 6 in particular, a bifurcated latch 160 is journaled on the auxiliary frame member 32 by means comprising a pin 162 for rocking between a horizontal position in which one end straddles the rod 24 for engaging a transverse pin 164 carried by the rod 24 and a canted position in which the latch 160 is inoperative to engage the pin 164. The other end of the latch 160 is connected by a pin 166 to a toggle comprising an upper link 168 and a lower link 170 interconnected by a pin 172 and having an over-center stop screw 174. When the links 168 and 170 are straight the latch 160 is held in operative position. The link 168 is connected by a pin 176 to a support 178 in which a wedge-shaped member 180, generally T-shaped in cross section, is movable with a heightwise extending portion thereof received against a similarly angled upper face of the support 178 while widthwise extending limbs of the member 180 are received in guideway means 182 secured to the frame 10. A screw 184 threaded into the support 178 is rotatable by a hand wheel 186 to move the wedge-shaped member 180 into and out of the machine for adjusting the heightwise position of the toggle and thus the operative position of the latch to provide a fine adjustment of the electrode position when stopped by the latch.

Means for releasing the latch at the end of the heating portion of the cycle comprises a solenoid 190 having an armature 192 connected to one end of a release lever 194 pivoted on a bracket 196 secured to the member 32 by means of a pin 198. The other end of the lever 194 is attached by a pin 200 to one end of a link 202 the other end of which is pivoted on the pin 172. Accordingly, energization of the solenoid 190 is operative to fold the latch toggle by pulling on the junction of its links 168 and 170 and thereby to move the latch into inoperative position. The latch is normally held straight by a spring 204 urging a pin 206 against the upper end of the lever 194.

In accordance with a further feature of the invention, control means are provided which are operative automatically to effect a predetermined sequence of steps of a heating and bonding cycle. Referring now to FIG. 17, the operation of the machine will now be described in connection with the schematic shown in said figure. It is assumed that current suitable at 220 volts and 60 cycles is supplied to the input leads 240. When a disconnect switch, C11 is closed, power is suppiled to the primary of a transformer T2 the secondary of which supplies control leads 242, 244 suitably at 115 volts. As a result the primary of transformer T1 (line 5) is energized supplying filament voltage to a rectifier from T1S (line 2). The energization of T4P (line 6) provides filament voltage for the oscillator tube and energizes the cooling fan 130. The "die-up" limit switch 1LS (line 8) being closed at this time, the control relay 2CR is energized closing the 2CR contacts and supplying 115 volts A.C. to the lead 246. Accordingly, the control relay 5CR (line 13) is energized closing its contacts (line 11). The operator disposes the workpiece between the presser members and operates a treadle closing the treadle switch (line 11) energizing a solenoid valve for supplying air to the motor 60. When the die has come down on the workpiece, limit switches 2LS (line 12) and 3LS (line 14) are closed. The "warm-up time" time delay relay 1TR having timed out closing the contacts 1TR (line 14), the operator will now initiate the heating portion of the cycle by depressing the push button switches 2PB and 3PB (lines 14 and 15) whereby a control relay 3CR (line 14) is energized from a charged capacitor C3 (line 15) and held through its contacts 3CR (line 14). The contacts 3CR (line 17) are likewise energized supplying energy to a time delay relay 2TR (line 17). Thus, the operator having closed a "weld switch" (line 19), energizes the control relay 4CR, closing contacts 4CR (line 1) to apply high voltage to the oscillator.

High energy frequency is accordingly supplied to the electrodes until the relay 2TR times out. Then 2TR transfers its contact arm (line 18) to shut off the high voltage and to initiate the operation of a time delay relay 3TR (line 18), simultaneously energizing the latch solenoid 190 to permit the electrodes to apply pressure in the bonding area for a cooling interval. If the operator wishes the die to be pressed through the workpiece thereafter, he will have closed a switch C13 (line 20). If so, after the relay 3TR has timed out, its contacts in line 20 energize a solenoid valve admitting air to the motor 80 whereby the die is advanced under high pressure to its terminal position. When a portion of a workpiece thus severed is removed from the machine and the parts thereof opened up, the two parts will be found to be seamed together with the frabric on one side and the foamed plastic on the other.

While the invention has been illustrated as applied to a cut-seaming operation, it will be understood that the herein described features of the apparatus are advantageously applied in other treatments such as embossing. If the upper electrode comprises an embossing die for imprinting a pattern on a plastic workpiece, it will generally be desirable to limit the closing movement of the embossing die during the heating interval. After the heating interval, depending on the nature of the work, the cooling time delay relay will suitably be set at a minimum delay so that the high pressure for implanting the design will be applied while the material is suitably soft.

Having thus described our invention, what we claim as new and desire to secure by Letters Patent of the United States is:

1. In an apparatus for treating dielectric heat softenable workpieces comprising first and second presser members mounted for relative movement toward and away from each other, at least one of said members carrying a tool arranged to engage an interposed workpiece, power means for effecting such movement, heating means comprising an electrode carried by each of said members, and means for connecting and heating means to a source of high frequency electric current, in combination therewith, stop means movable between an operative position for limiting relative movement of the presser members toward each other to establish a minimum spacing of the electrodes, and an inoperative position in which such movement is not so limited and means including control means operable to effect movement of said stop means from operative position to inoperative position to permit further movement of said members for completion of a treatment of a workpiece after a period of dielectric heating.

2. Apparatus as in claim 1 in which said control means includes timing means operative to cause movement of said stop means into inoperative position in predetermined time relation with the termination of a period of dielectric heating of a workpiece.

3. Apparatus as in claim 2 and additionally comprising power means, controlled by said timing means for operation in predetermined time relation with the movement of the stop means into inoperative position, for effecting relative movement of said presser members toward each other under a pressure greater than the pressure applied by first said power means prior to said movement of the stop means.

4. Apparatus as defined in claim 1 in which one of said presser members is carried by a rod mounted for movement of reciprocation and said stop means comprises a latch engageable with an element carried by said rod.

5. In apparatus for treating dielectric heat softenable workpieces, said apparatus comprising a frame, first and second presser members, said first member being mounted for movement toward and away from said second member, at least one of said members carrying a tool arranged to engage an interposed workpiece, heating means comprising an electrode carried by each member, means for connecting the electrodes to a source of high frequency electric current and power means for effecting such movement of said first presser member, said power means comprising a first fluid pressure operated expansible chamber motor carried by the frame and having an output member moved in response to operation of said motor and connected with said first presser member for providing movement thereof at a substantially constant predetermined mechanical advantage for pressing said tool against a workpiece under a holddown pressure, in combination therewith, a second fluid pressure operated expansible chamber motor carried by the frame and having an output member moved in response to the operation of said second motor, and means for connecting said last output member of said second motor and said first pressure member, said last connecting means providing movement of said first pressure member with movement of said last output member at a mechanical advantage greater than said predetermined advantage.

6. Apparatus as defined in claim 5 in which said last connected means comprises a toggle having two links connected, at one end of each link, together and to said last output member.

7. Apparatus as in claim 6 and additionally comprising lost motion connecting means between said output member and said links.

References Cited

UNITED STATES PATENTS 3,413,173   11/1968   Long _____ 156—380

SAMUEL FEINBERG, Primary Examiner

U.S. Cl.X.R.

60—97; 91—36, 412